US011895469B2

(12) United States Patent
Jiang

(10) Patent No.: US 11,895,469 B2
(45) Date of Patent: Feb. 6, 2024

(54) AUDIO CIRCUIT AND MOBILE TERMINAL PROVIDED WITH AUDIO CIRCUIT

(71) Applicant: XI'AN ZHONGXING NEW SOFTWARE CO. LTD., Xi'an (CN)

(72) Inventor: Fabiao Jiang, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 251 days.

(21) Appl. No.: 17/617,106

(22) PCT Filed: May 21, 2020

(86) PCT No.: PCT/CN2020/091498
§ 371 (c)(1),
(2) Date: Dec. 7, 2021

(87) PCT Pub. No.: WO2020/259143
PCT Pub. Date: Dec. 30, 2020

(65) Prior Publication Data
US 2022/0232319 A1 Jul. 21, 2022

(30) Foreign Application Priority Data
Jun. 28, 2019 (CN) .......................... 201910576182.X

(51) Int. Cl.
*H04R 3/00* (2006.01)
*G06F 3/16* (2006.01)
(Continued)

(52) U.S. Cl.
CPC ............. *H04R 3/007* (2013.01); *G06F 3/162* (2013.01); *H04R 1/028* (2013.01); *H04R 1/04* (2013.01);
(Continued)

(58) Field of Classification Search
CPC .......... H04R 3/007; H04R 1/028; H04R 1/04; H04R 2499/11
(Continued)

(56) References Cited

U.S. PATENT DOCUMENTS 7,882,743 B2    2/2011  Goldberg et al.
9,357,295 B2 *  5/2016  Florian .................... H04R 1/04
(Continued)

FOREIGN PATENT DOCUMENTS

CN    201774652 A    3/2011
CN    102780938 A    11/2012
(Continued)

OTHER PUBLICATIONS

Chinese Office Action for Application No. 201910576182.X, dated Aug. 31, 2021, 12 pages including translation.
International Search Report for Application No. PCT/CN2020/091498, dated Jul. 6, 2020, 4 pages including English translation.

*Primary Examiner* — Disler Paul
(74) *Attorney, Agent, or Firm* — Morgan, Lewis & Bockius LLP

(57) ABSTRACT

Provided are an audio circuit and a mobile terminal having the audio circuit. The audio circuit includes an audio codec chip circuit, a radio frequency circuit and a main circuit board reference ground; the sub-circuit board is provided with a microphone circuit, an antenna circuit, a sub-circuit board reference ground, a decoupling capacitor and a first anti-static device; where the audio codec chip circuit is configured to provide a bias voltage for the sub-circuit board through a transmission line in the main circuit board; the decoupling capacitor and the first anti-static device are connected in parallel and then are connected to the transmission line, and the transmission line is connected to the
(Continued)

main circuit board reference ground through the decoupling capacitor and the first anti-static device which are connected in parallel.

10 Claims, 1 Drawing Sheet

(51) Int. Cl.
*H04R 1/02* (2006.01)
*H04R 1/04* (2006.01)
*H04M 1/02* (2006.01)

(52) U.S. Cl.
CPC ....... *H04M 1/0277* (2013.01); *H04R 2499/11* (2013.01)

(58) Field of Classification Search
USPC ...................... 381/55, 92, 111, 113–115, 122
See application file for complete search history.

(56) References Cited

U.S. PATENT DOCUMENTS

| | | | | |
|---|---|---|---|---|
| 9,794,665 | B2* | 10/2017 | Florian | H04R 1/04 |
| 10,653,210 | B2* | 5/2020 | Bennett | H04N 23/51 |
| 10,764,680 | B2* | 9/2020 | Park | H03F 1/30 |
| 11,159,882 | B2* | 10/2021 | Song | H04R 1/1033 |

FOREIGN PATENT DOCUMENTS

| | | |
|---|---|---|
| CN | 102843898 A | 12/2012 |
| CN | 203788450 A | 8/2014 |
| CN | 105306626 A | 2/2016 |
| CN | 105992098 A | 10/2016 |
| CN | 106328157 A | 1/2017 |
| CN | 107809702 A | 3/2018 |
| JP | 2013030722 A | 2/2013 |

* cited by examiner

US 11,895,469 B2

AUDIO CIRCUIT AND MOBILE TERMINAL PROVIDED WITH AUDIO CIRCUIT

CROSS-REFERENCES TO RELATED APPLICATIONS

This is a National Stage Application, filed under 35 U.S.C. 371, of International Patent Application No. PCT/CN2020/091498, filed on May 21, 2020, which is based on and claims priority to Chinese Patent Application No. 201910576182.X, filed with the CNIPA on Jun. 28, 2019, disclosure of which is incorporated herein by reference in its entirety.

TECHNICAL FIELD

The present application relates to the field of audios, and for example, to an audio circuit and a mobile terminal having the audio circuit.

BACKGROUND

As shown in FIG. 1, for the circuit design of the smart phone in the related art, a structure including a main circuit board and a sub-circuit board is adopted, and this structure is also referred to as a main and sub-board circuit structure. An antenna circuit, a microphone audio input circuit, a charging interface and the like are designed on the sub-circuit board, and circuits such as a baseband circuit and a radio frequency circuit are designed on the main circuit board. When a maximum transmitting power is applied to a radio frequency antenna circuit of the sub-circuit board, radio frequency radiation common-mode interference current may flow through a reference ground plane of the sub-circuit board. In the related art, a microphone is generally grounded at a sub-circuit board side to solve the influence caused by the interference current.

However, certain impedance Z exists between a reference ground plane SGND of the sub-circuit board and a reference ground plane GND of the main circuit board, the radio frequency radiation common-mode interference current is converted into a differential current of the microphone audio input circuit through the ground plane impedance Z, so that an interference voltage is superposed in an input current of the microphone to form the audio noise, and this noise severely affects the audio quality.

SUMMARY

The present application provides an audio circuit and a mobile terminal having the audio circuit, which provides an effective scheme for eliminating radio frequency radiation common-mode interference current.

An embodiment of the present application provides an audio circuit. The audio circuit includes a main circuit board and a sub-circuit board disposed to be separated from the main circuit board.

The main circuit board includes an audio codec chip circuit, a radio frequency circuit and a main circuit board reference ground. The sub-circuit board is provided with a microphone circuit, an antenna circuit, a sub-circuit board reference ground, a decoupling capacitor and a first anti-static device. The audio codec chip circuit is configured to provide a bias voltage for the sub-circuit board through a transmission line in the main circuit board. The antenna circuit is electrically connected to the radio frequency circuit, and the microphone circuit is electrically connected to the audio codec chip circuit. The microphone circuit includes a microphone audio differential positive electrode output pin, a microphone audio differential negative electrode output pin and a microphone bias voltage pin. The microphone audio differential positive electrode output pin and the microphone audio differential negative electrode output pin are both connected to the audio codec chip circuit. The decoupling capacitor and the first anti-static device are connected in parallel and then are connected to the transmission line, and the transmission line is connected to the main circuit board reference ground through the decoupling capacitor and the first anti-static device which are connected in parallel.

An embodiment of the present application further provides a mobile terminal including an audio circuit, and the audio circuit is the audio circuit of any one of the embodiments of the present application.

DETAILED DESCRIPTION

The technical schemes in the embodiments of the present application will be described below in conjunction with the drawings in the embodiments of the present application, and the described embodiments are only some, but not all, embodiments of the present application.

A certain impedance Z exists between a reference ground SGND of a sub-circuit board and a reference ground GND of a main circuit board when respective reference ground planes of the sub-circuit board and the main circuit board are connected by a connecting circuit to perform a circuit signal connection. Due to the existence of the impedance Z, when a common-mode current generated by radiation of a radio frequency antenna flows through the impedance Z, an interference voltage will be generated. However, when an audio signal of a microphone circuit also uses this reference impedance as loop backflow, a generated interference voltage will be superposed on an audio signal loop, and thus the common ground resistance anti-interference is generated.

In order to solve the above technical problems, the technical solutions provided in the embodiments of the present application is described below in conjunction with the attached drawings.

Figure 1:
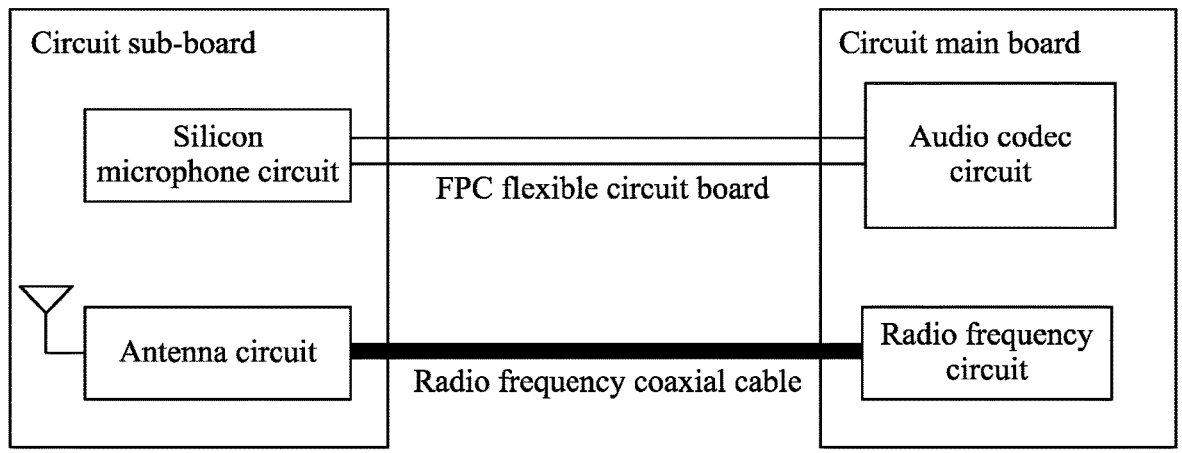
FIG. 1 is a schematic diagram showing structures of an audio circuit provided in the related art.
Figure 2:
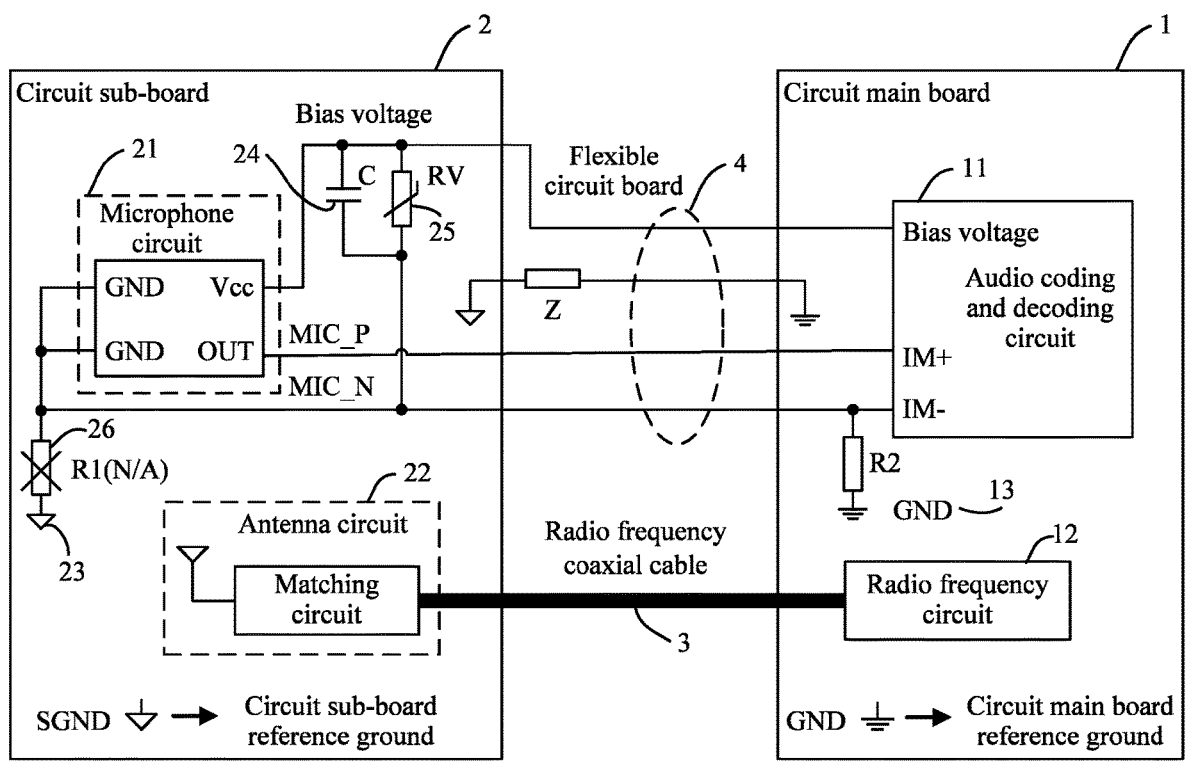
FIG. 2 is a schematic diagram showing structures of an audio circuit according to an embodiment of the present application.

Referring to FIG. 2, an audio circuit provided in an embodiment includes a main circuit board 1 and a sub-circuit board 2 separately disposed with the main circuit board 1. Herein, the word of "separately disposed" means that the main circuit board 1 and the sub-circuit board 2 are two independent circuit boards. The main circuit board 1 includes an audio codec chip circuit 11, a radio frequency circuit 12 and a main circuit board reference ground 13. The sub-circuit board 2 is provided with a microphone circuit 21, an antenna circuit 22 and a sub-circuit board reference ground 23. The audio codec chip circuit 11 provides a bias voltage Micbias for the sub-circuit board 2. The antenna circuit 22 is electrically connected to the radio frequency circuit 12, and the microphone circuit 21 is electrically connected to the audio codec chip circuit 11. The microphone circuit 21 includes a microphone audio differential positive electrode output pin (referred as Mic_P) and a microphone audio differential negative electrode output pin (referred as Mic_N), and the microphone audio differential positive electrode output pin Mic_P and the microphone audio differential negative electrode output pin Mic_N are both connected to the audio codec chip circuit 11. The sub-circuit board 2 is further provided with a decoupling capacitor 24 and a first anti-static device 25, and the decoupling capacitor 24 and the first anti-static device 25 are connected in parallel and then connected to a transmission line which provides the bias voltage MicBias for the sub-circuit board 2 in the main circuit board 1. The transmission line is connected to the main circuit board reference ground 13 through the decoupling capacitor 24 and the first anti-static device 25 which are connected in parallel.

The microphone circuit 21 is configured to convert a sound signal into an electrical signal. In an embodiment, a microphone in this audio circuit is a silicon microphone. In order to improve the sound processing quality of the silicon microphone, an anti-interference circuit (not shown in the drawings) is further disposed around the silicon microphone, and the anti-interference circuit may be realized by devices such as a resistor, an inductor and a capacitor. The silicon microphone includes a bias voltage pin VCC and a ground pin GND, the microphone audio differential positive electrode output pin Mic_P and the microphone audio differential negative electrode output pin Mic_N described above are pins of the silicon microphone. The audio codec chip circuit 11 includes an audio codec chip and a peripheral function circuit. The audio codec chip includes a bias voltage output pin MicBias, a microphone positive electrode sampling input pin IM + of the audio codec chip, and a microphone negative electrode sampling input pin IM − of the audio codec chip.

In order to simplify a structure of the audio circuit, the microphone audio differential negative electrode output pin Mic_N is connected to the audio codec chip circuit 11 through a first connecting circuit not shown in the drawings). The decoupling capacitor 24 and the first anti-static device 25 are connected in parallel and then communicate the transmission line with the main circuit board reference ground 13 through the first connecting circuit. In the embodiments of the present application, the first connecting circuit refers to a path connected between the microphone audio differential negative electrode output pin Mic_N and the audio codec chip input pin IM −, after the decoupling capacitor 24 and the first anti-static device 25 are connected in parallel, one end thereof is connected to a bias voltage MicBias transmission line, and another end thereof is connected to the first connecting circuit. Therefore, the bias voltage is connected to the reference ground GND of the main circuit board by means of the first connecting circuit, a simple differential loop is constructed for bias voltage backflow. In order to facilitate backflowing to flow through the reference ground GND of the main circuit board 2, a grounding resistor R2 is selected to be 0 ohm. The first anti-static device 25 may select a varistor or a transient voltage suppressor diode (TVS) (referred as RV) as desired.

Since the silicon microphone on the sub-circuit board 2 is easy to be damaged or interfered by static electricity, for this reason, the sub-circuit board 2 described in this embodiment is further provided with a second anti-static device 26. In addition, the first connecting circuit is further connected to the sub-circuit board reference ground 13 through the second anti-static device 26. In such way, the electrostatic current may be discharged to a ground plane of the sub-circuit board 2 nearby. Herein, the second anti-static device 26 in this embodiment may also select a varistor R1 or a TVS as desired.

The antenna circuit 22 in this embodiment includes an antenna impedance matching circuit knot shown in the drawings) and a radio frequency antenna knot shown in the drawings), and the antenna circuit and the radio frequency circuit are connected through a radio frequency coaxial cable 27.

A flexible printed circuit (FPC) knot shown in the drawings) may be applied to different spaces, so that the main circuit board 1 and the sub-circuit board 2 may be connected by selecting the flexible printed circuit (FPC). In this embodiment, the microphone circuit is electrically connected to the audio codec chip circuit through the flexible printed circuit (FPC).

On the other hand, the present application provides a mobile terminal including an audio circuit, and the audio circuit is the audio circuit of any one of the embodiments described above. For an intelligent mobile terminal, the radio frequency circuit in this embodiment is a radio frequency amplifier circuit applied to an 850 MHz/900 MHz band in a global system for mobile communications (GSM), so that an antenna on the sub-circuit board 2 is a GSM 850 MHz/900 MHz band antenna matched with the radio frequency circuit.

In the embodiments of the present application, a bias voltage transmission line of the sub-circuit board 2 is connected to the main circuit board reference ground 13 near the audio codec chip circuit 11 of the main circuit board 1 through the decoupling capacitor 24 and the first anti-static device 25 which are connected in parallel, so that a bias voltage MicBias loop forms a differential circuit, the interference of a radio frequency radiation common-mode current is inhibited, and thus the audio noise introduced by the bias voltage MicBias loop is eliminated. Furthermore, in this embodiment, after the sub-circuit board reference ground 23 is grounded through the second anti-static device 26, interference such as static electricity on the sub-circuit board 2 may be effectively prevented, introduction of a large-area sub-circuit board reference ground 23 is avoided, the occupied space of the sub-circuit board 2 is reduced, and meanwhile the cost is saved.

What is claimed is:

1. An audio circuit, comprising a main circuit board and a sub-circuit board which are two independent circuit boards; the main circuit board comprising an audio codec chip circuit, a radio frequency circuit and a main circuit board reference ground;

the sub-circuit board being provided with a microphone circuit, an antenna circuit, a sub-circuit board reference ground, a decoupling capacitor and a first anti-static device; and the audio codec chip circuit being configured to provide a bias voltage for the sub-circuit board through a transmission line in the main circuit board, the antenna circuit being electrically connected to the radio frequency circuit, and the microphone circuit being electrically connected to the audio codec chip circuit;

the microphone circuit comprising a microphone audio differential positive electrode output pin, a microphone audio differential negative electrode output pin and a microphone bias voltage pin, and the microphone audio differential positive electrode output pin and the microphone audio differential negative electrode output pin being both connected to the audio codec chip circuit; and the decoupling capacitor and the first anti-static device being connected in parallel and then being connected to the transmission line, and the transmission line being connected to the main circuit board reference ground through the decoupling capacitor and the first anti-static device which are connected in parallel.

2. The audio circuit of claim 1, further comprising a first connecting circuit, wherein the microphone audio differential negative electrode output pin is connected to the audio codec chip circuit through the first connecting circuit, and the transmission line is connected to the main circuit board reference ground through the first connecting circuit after the decoupling capacitor is connected to the first anti-static device in parallel.

3. The audio circuit of claim 2, wherein the sub-circuit board is further provided with a second anti-static device, and the first connecting circuit is connected to the sub-circuit board reference ground through the second anti-static device.

4. The audio circuit of claim 3, wherein the second anti-static device is a varistor or a transient voltage suppressor diode.

5. The audio circuit of claim 2, wherein a grounding resistance of a main circuit board reference ground used upon communicating the transmission line with the main circuit board reference ground is 0 ohm.

6. The audio circuit of claim 1, wherein the first anti-static device is a varistor or a transient voltage suppressor diode.

7. The audio circuit of claim 1, wherein the microphone circuit further comprises a silicon microphone device and an anti-interference circuit, and the silicon microphone device is configured to convert a sound signal into an electrical signal.

8. The audio circuit of claim 1, wherein the antenna circuit comprises a radio frequency antenna and an antenna impedance matching circuit connected to the radio frequency antenna, and the antenna circuit is connected to the radio frequency circuit through a coaxial cable.

9. The audio circuit of claim 1, further comprising a flexible circuit board, and the microphone circuit is electrically connected to the audio codec chip circuit through the flexible circuit board.

10. A mobile terminal, comprising an audio circuit, wherein the audio circuit comprising a main circuit board and a sub-circuit board disposed to be separated from the main circuit board which are two independent circuit boards;

the main circuit board comprising an audio codec chip circuit, a radio frequency circuit and a main circuit board reference ground;

the sub-circuit board being provided with a microphone circuit, an antenna circuit, a sub-circuit board reference ground, a decoupling capacitor and a first anti-static device; and the audio codec chip circuit being configured to provide a bias voltage for the sub-circuit board through a transmission line in the main circuit board, the antenna circuit being electrically connected to the radio frequency circuit, and the microphone circuit being electrically connected to the audio codec chip circuit;

the microphone circuit comprising a microphone audio differential positive electrode output pin, a microphone audio differential negative electrode output pin and a microphone bias voltage pin, and the microphone audio differential positive electrode output pin and the microphone audio differential negative electrode output pin being both connected to the audio codec chip circuit; and the decoupling capacitor and the first anti-static device being connected in parallel and then being connected to the transmission line, and the transmission line being connected to the main circuit board reference ground through the decoupling capacitor and the first anti-static device which are connected in parallel.

\* \* \* \* \*